United States Patent
Gohl (10) Patent No.: US 9,552,062 B2
(45) Date of Patent: Jan. 24, 2017

(54) GAZE-BASED SECURITY

(71) Applicant: EchoStar UK Holdings Limited, Keighley, West Yorkshire (GB)

(72) Inventor: Mark Gohl, Keighley (GB)

(73) Assignee: EchoStar UK Holdings Limited, Keighley (GB)

( * ) Notice: Subject to any disclaimer, the term of this patent is extended or adjusted under 35 U.S.C. 154(b) by 0 days.

(21) Appl. No.: 14/478,988

(22) Filed: Sep. 5, 2014

(65) Prior Publication Data

US 2016/0070344 A1 Mar. 10, 2016

(51) Int. Cl.
G06F 3/01 (2006.01)
G09G 5/36 (2006.01)
H04W 12/02 (2009.01)
H04N 13/04 (2006.01)

(52) U.S. Cl.
CPC ............... G06F 3/013 (2013.01); G09G 5/36 (2013.01); H04W 12/02 (2013.01); G09G 2358/00 (2013.01); H04N 2013/0463 (2013.01)

(58) Field of Classification Search
CPC ...... G06F 3/01–3/013; G06F 3/0481–3/04815; G06F 21/60–21/645; H04N 21/235–21/2358; H04N 21/435–21/4358; G06K 9/00221–9/00355; G09G 5/36; G09G 2358/00; H04W 12/00; H04W 12/02
See application file for complete search history.

(56) References Cited

U.S. PATENT DOCUMENTS

| | | | | |
|---|---|---|---|---|
| 2009/0141895 A1* | 6/2009 | Anderson | ............... | G06F 21/84 380/252 |
| 2009/0273562 A1 | 11/2009 | Baliga et al. | | |
| 2010/0205667 A1* | 8/2010 | Anderson | ............... | G06F 3/013 726/19 |
| 2011/0161999 A1* | 6/2011 | Klappert | ............ | H04N 21/4307 725/25 |
| 2013/0117813 A1* | 5/2013 | Yudkin | .................... | G06F 21/00 726/2 |
| 2013/0235073 A1* | 9/2013 | Jaramillo | ................. | G09G 5/00 345/619 |
| 2014/0201844 A1* | 7/2014 | Buck | ....................... | G06F 21/50 726/26 |

OTHER PUBLICATIONS

International Search Report and Written Opinion for PCT/GB2015/052489 mailed Oct. 28, 2015, all pages.

* cited by examiner

*Primary Examiner* — Nathan Danielsen
(74) *Attorney, Agent, or Firm* — Kilpatrick Townsend & Stockton LLP (57) ABSTRACT

Systems and methods for presenting actual data on a display device based on eye-tracking data. An eye-tracking engine receives sensed data from an eye-tracking device, determines a movement status of an eye based on the sensed data, and determines a display configuration based on the determined movement status. The display configuration is output on the display device and includes masking data when the determined movement status indicates the eye is in motion.

21 Claims, 7 Drawing Sheets

GAZE-BASED SECURITY

BACKGROUND

Monitors and other display screens offer limited privacy in regard to the textual or graphical information presented thereon. For instance, when information is displayed on a monitor screen, the information is typically viewable by anyone looking at the screen. In some cases, the information contains private information that is intended for a particular user. However, the privacy of such information is jeopardized if a passerby or other people located in proximity to the user looks at the screen. This may occur often, particularly at crowded locations such as coffee shops, or anywhere that "looking-over-the-shoulder" is a problem. In other cases, enhanced security measures are desired. This disclosure is intended to address these concerns and to provide related advantages.

SUMMARY

In an aspect, this disclosure provides a system for presenting actual data on a display device based on eye-tracking data. The system includes one or more processors and a memory communicatively coupled with and readable by the one or more processors. The memory has stored therein processor-readable instructions that, when executed by the one or more processors, cause the one or more processors to receive sensed data on an eye from an eye-tracking device, determine a movement status of the eye based on the sensed data, and determine a display configuration for output on the display device based on the movement status. Further, the processor-readable instructions cause the one or more processors to output the display configuration through the display device, wherein the display device comprises masking data when the movement status indicates the eye is in motion.

Embodiments detailed herein may have one or more of the following features. The system may include a television receiver configured to output the actual data in the display configuration when the movement status indicates the eye is stationary. The television receiver may output a combination of the masking data and the actual data in the display configuration when the movement status indicates the eye is stationary. The television receiver may determine a gaze-point based on the sensed data. Further, the television receiver may output the actual data at the gaze-point where the sensed data indicates that the eye is stationary and output the masking data in a remainder of the display configuration. The television receiver may determine a word length and a spacing pattern of the actual data and generate the masking data based on the word length and the spacing pattern. The television receiver may display the masking data as an overlay on the actual data surrounding a gaze-point so that the actual data at the gaze-point is not masked. Still further, the television receiver may generate the masking data to comprise nonsense text. The television receiver may identify a user by comparing the sensed data to reference data comprising at least one reference eye profile. Even further, the television receiver may output the masking data when the sensed data indicates an unauthorized user is present.

In another aspect, this disclosure provides a method for presenting actual data on a display device based on eye-tracking data. The method includes the step of receiving, at an eye-tracking engine, sensed data from an eye-tracking device. The method may further include the steps of determining, by the eye-tracking engine, a movement status of an eye based on the sensed data and determining, by the eye-tracking engine, a display configuration for output on the display device based on the determined movement status. Further, the method may include the step of outputting, by the eye-tracking engine, the display configuration through the display device. The display configuration may comprise masking data when the movement status indicates that the eye is in motion.

Embodiments detailed herein may have one or more of the following features. The method may include removing, by the eye-tracking engine, the masking data from the display configuration when the movement status indicates the eye is stationary and displaying, by the eye-tracking device, the actual data when the movement status indicates the eye is stationary. Further, the method may include determining, by the eye-tracking engine, a gaze-point of the eye and displaying, by the eye-tracking engine, the actual data at the determined gaze-point when the movement status indicates the eye is stationary.

In yet another aspect, this disclosure provides an eye-tracking device for determining a status of a user's eye and presenting actual data based on the determined status. The eye-tracking device may include a camera for sensing data based on the user's eye. The eye-tracking device may further include one or more processors and a memory communicatively coupled with and readable by the one or more processors. The memory may have stored therein processor-readable instructions that, when executed by the one or more processors, cause the one or more processors to determine an overlay display configuration comprising masking data. The masking data is based on at least one of a word length and a spacing pattern of the actual data. The processor-readable instructions may further cause the one or more processors to determine that the user's eye is directed to a display screen coupled to the eye-tracking device, and based on the sensed data, determine that the user's eye is in motion. After determining that the user's eye is in motion, the one or more processors may display the overlay display configuration and the actual data on the display screen, wherein the overlay display configuration overlaps the actual data displayed on the display screen. The processor-readable instructions may further cause the one or more processors of the eye-tracking device to determine a gaze-point of the user's eye and after determining the gaze-point, remove at least a portion of the overlay display configuration to display the actual data at the determined gaze-point on the display screen.

Embodiments detailed herein may have one or more of the following features. The eye-tracking device may determine a user profile based on at least one of a username and a passcode received by the eye-tracking device. The eye-tracking device may compare the sensed data comprising detected features of the user's eye to reference features stored in a database and identify the user's eye based on the comparison. The eye-tracking device may determine a user profile based on the identified user's eye and determine the overlay display configuration based on settings associated with the determined user profile. Further, the eye-tracking device may determine, after determining that the user's eye is directed to the display screen, a presence of one or more foreign eyes for a threshold period of time and display, after reaching the threshold period of time, a notification on the display screen indicating that an intruder is present. Even further, the eye-tracking device may remove the actual data from the display screen after reaching the threshold period of time and lock the display screen after reaching the threshold period of time.

DETAILED DESCRIPTION

The present disclosure is directed to systems and methods for enhancing privacy of information presented on a display screen associated with a computerized device, such as a mobile phone, smartphone, laptop, teller station, ATM, computer, tablet computer, e-reader, set-top-box, or any other device in any situation where a user is interested in viewing privacy. More particularly, the disclosure provides a gaze-based security system for obscuring information presented on the display screen based on measuring the user's eye movement and/or location. For instance, a display configuration may provide both actual data, e.g. actual information, and masking data, e.g. nonsense information, that are arranged and/or timed for display in a display configuration. The display configuration is determined by the gaze-based system to correspond to a measured movement or lack thereof of the user's eye, e.g. movements while reading or viewing data on the display screen as measured by an eye-tracking device. Such actual and/or masking data in the display configuration may comprise text, graphics, or a combination of both, that are presented in a manner for secure delivery of the protected information.

In practice, the gaze-based system described herein may prevent private information from being easily consumed by an unwanted individual glancing over. The systems and methods described herein may be used, alternatively or additionally, with other security measures, such as other username and passcode arrangements. Merely by way of example, the present disclosure may prevent someone from seeing an account number or credit card information displayed on the display screen that is intended only for the user. In another aspect, the systems and method provided herein may alert the user if a foreign viewer is detected to be in proximity and/or viewing the user's display screen.

Figure 1:
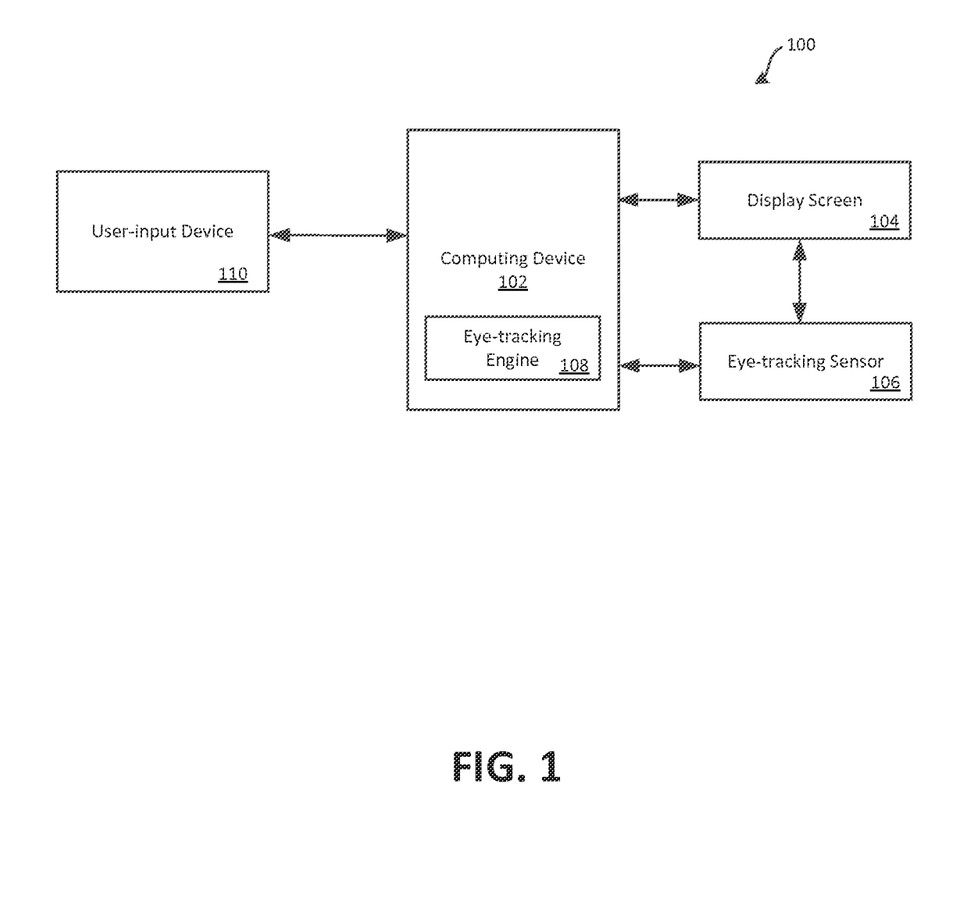
FIG. 1 shows a gaze-based security system according to various embodiments of the present disclosure.

FIG. 1 illustrates one possible implementation of the present disclosure with a gaze-based security system 100 comprising a computing device 102 that may send data for display to a display screen 104 or other display device. For instance, the display screen 104 may output textual and/or graphical information, such as masking data and actual data, to the user as instructed by the computing device 102. The computing device 102 is further in operative one or two-way communication with an eye-tracking sensor 106 that detects the user's eye movements and sends the sensed data to the computing device 102. The eye-tracking sensor 106 may comprise any of a variety of sensors that are capable of detecting, automatically and/or when queried by the computing device 102, precise eye movements as described in the succeeding paragraphs. Merely by way of example, the eye-tracking sensor 106 may include an image sensor provided for by a camera, such as a front-facing camera of a laptop or mobile phone that is directed toward the user's eye(s).

The sensed data from the eye-tracking sensor 106 is sent to the computing device 102 for further consideration by an eye-tracking engine 108 of the computing device 102. The eye-tracking engine 108 may analyze the status data and determine a movement status of the eye, such as whether the eye is in motion or stationary. Further, the eye-tracking engine 108 may manage a display configuration based on the sensed data and/or determined movement status. For example, the eye-tracking engine 108 may output the actual data on the display screen 104 when the sensed data indicates that the user's eyes are stationary and remove the actual data from output when the sensed data indicates that the user's eyes are moving across the display screen 104. Further, the computing device 102 and/or the eye-tracking engine 108 may provide various user interfaces for interaction with and to receive input from the user. Such user input may be received via user-input devices 110, such as a keyboard, mouse, microphone, mobile phone, or other computing device hardwired or in wireless communication with the computing device 102 through a communication network.

In regard to FIG. 1, it is noted that any components may be contained in any other component, e.g. the display screen 104, eye-tracking sensor 106, computing device 102 and/or the user-input device 110 may comprise an integral unit. Further, any connections, wireless or hardwired, can be established between any of the components and are not limited to the connections as illustrated. Still further, the gaze-based security system 100 may contain and/or communicate with additional components not shown, such as smart devices and other devices operatively connected therewith. Such communications may be unidirectional or bidirectional, and may utilize networks such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the gaze-based security system 100. In general, various types of information may be transmitted and/or received via a network interface of the gaze-based security system.

Still in reference to FIG. 1, it is contemplated that the eye-tracking sensor 106 may follow movement of an eye, such as measuring rotations, eye movement, eye position, and/or eye gaze of the user, and send such measurements in real-time to the eye-tracking engine 108 while the user is viewing data, e.g. reading text, on the display screen 104. In one embodiment, the eye-tracking sensor 106 is a remote device without invasive attachments to the user's eye. For instance, the eye-tracking sensor 106 may comprise an optical tracking device that directs a light beam to the user's eye and picks up reflection patterns with a sensor system, such as a video camera, laptop camera, or other optical sensor that is quick enough to capture fast eye movements. The eye-tracking sensor 106 may locate a point of gaze of the user, such as where the user's eye is looking, or changes in the gaze direction, such as rotations of the user's eye. In another aspect, the eye-tracking sensor 106 may measure a motion of the eye relative to the user's head. It is contemplated that many eye-tracking methods may be applicable, including using video images for extracting eye positions, electrooculograms, passive detectors that may not require a special source of illumination, and detectors that require a special encoding, e.g. contact lens. In another aspect, the eye-tracking sensor 106 may include a detector that uses very narrow bands with special illumination and are out of the visible band detection, e.g. terahertz and IR-UV (infrared-ultraviolet) head mounted detectors.

In practice, it is contemplated that the eye-tracking sensor 106 detects if the user is viewing textual and/or graphical information, such as reading or typing a line of text through the user-input device 110. The eye-tracking sensor 106 may detect the user's pattern of eye movement while reading or viewing the data and locate a point of gaze, or where the eye is looking, particularly if the eye is stopped. It is contemplated that while reading text, the user's eye moves in a pattern that involves a series of short stops ("fixations") on words during which text may be recognized, and fast, simultaneous movements of both eyes in the same direction ("saccades") to the next word or words, during which the user's eye is unable to recognize text. The eye-tracking sensor 106 may detect when and where the user's eye stops and provide the sensed data to the eye-tracking engine 108 for further processing, as described in the succeeding paragraphs. It is contemplated that during silent reading, the fixation phase or stopping period may last about a quarter of a second and may stop on a portion of a word, a whole word, or large chunks of words depending on whether the user is a slower or quicker reader. Furthermore, it is noted that the principle of operation for sensing eye movement as described herein is applicable for scanning any variety of scenes, including images that may or may not contain text. Eye movement while scanning images may be irregular, since the eye may start and stop more irregularly depending on the placement of the image(s) that the eye is directed to.

Figure 2:
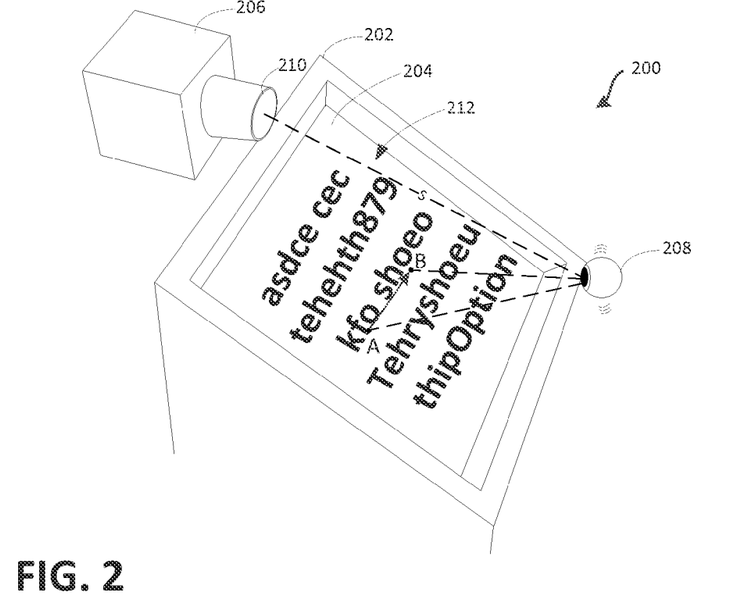
FIG. 2 shows an example obscured display configuration that can be provided by the system of FIG. 1 when the user's eye is in motion.

Turning now to FIG. 2, a system 200 is shown comprising a computing device 202 with a display screen 204 and an eye-tracking sensor 206 that is directed toward an eye 208 of the user. More particularly, the eye-tracking sensor 206 detects the user's eye 208 for motion and/or to determine a gaze-point of the user's eye. For example, the eye-tracking sensor 206 may comprise a camera having a lens 210 or other input-receiving means that is configured to point to the user's eye 208 along a line S. In some embodiments, the eye-tracking sensor 206 may comprise pivoting means or other moving or mounting components. For instance, the eye-tracking sensor 206 may rotate, automatically and/or upon manual adjustment by the user, to accommodate different eye-levels and user heights. Furthermore, the eye-tracking sensor 206 may automatically rotate to follow the user's eye while the user's eye is scanning the display screen 204 for optimized sensing and detection. It is contemplated that the eye-tracking sensor 206 may be mounted on, integral with, or separate from the display screen 204 and/or the computing device 202.

Still referring to FIG. 2, an obscured display configuration 212 is provided on the display screen 204 while the user's eye 208 is in motion, e.g., during short saccadic movements between fixation stops, such as movement of the eye 208 from point A to point B. More particularly, it is contemplated that during such saccadic motions of the eye 208, the user is effectively blind and unable to recognize text and/or images. When the eye-tracking sensor 206 detects the saccadic phase and outputs the obscured display configuration 212 as shown in FIG. 2, the user may not visably register, recognize, or see the obscured display configuration 212. Rather, the display configuration 212 may be viewable by a potential third-party viewer, such as a passerby, whose pattern of eye movement while looking at the display screen 204 is different than the eye movement pattern of the user's eye 208. For instance, the third party's eye may be in a fixation phase and able to register or see the obscured display configuration 212 while the user's eye 208 is in a saccadic phase and unable to see the obscured display configuration 212. In this way, the system 200 may eliminate or mitigate over-the-shoulder-looking problems that may jeopardize the user's privacy.

As shown in FIG. 2, the display configuration 212 may be completely obscured, e.g. comprises all masking data and no actual data such as protected information. It is contemplated that the masking data may be any data that is not private or intended to be protected. Such data may include nonsense, random letters and/or symbols as shown in FIG. 2, coherent text and/or sentences having nothing to do with the protected information, and/or graphics, hieroglyphics, web-dings, emoticons, characters from other languages, live news headlines, user-customized text, and so on. In a different embodiment, it is contemplated that the display configuration 212 is blank and/or comprises other color schemes when the eye-tracking sensor 206 detects saccadic movement. In one embodiment, it is contemplated that the user may select a type of masking data and/or obscured display configuration 212 to be output. Such user selections may be stored, for instance, in a user-profile, such that when the eye-tracking engine 108 determines a particular user is present, either by user/passcode identification and/or sensing from the eye-tracking sensor 206, a particular obscured display configuration 212 may be implemented.

It is noted that while FIG. 2 shows a horizontal, left-to-right motion of the eye 208 from point A to point B, other movement directions may be contemplated. For instance, viewing or reading may require movements, e.g. saccadic movements, in a variety of directions such as horizontal, vertical, left-to-right, right-to-left, diagonal, random, and/or other directions or combinations thereof. Such movements may depend on the layout of text or graphics on the screen and/or nature of a particular language. For instance, if the text is oriented vertically, the user may scan the screen in vertical saccadic movements. In some embodiments, it is contemplated that the user may select, or otherwise indicate to the eye-tracking engine 108 of the computing device 202, one or more reading directions for one or more different types of text. Such selections may be input through the user-input device 110 and/or associated with the user-profile.

Figure 3:
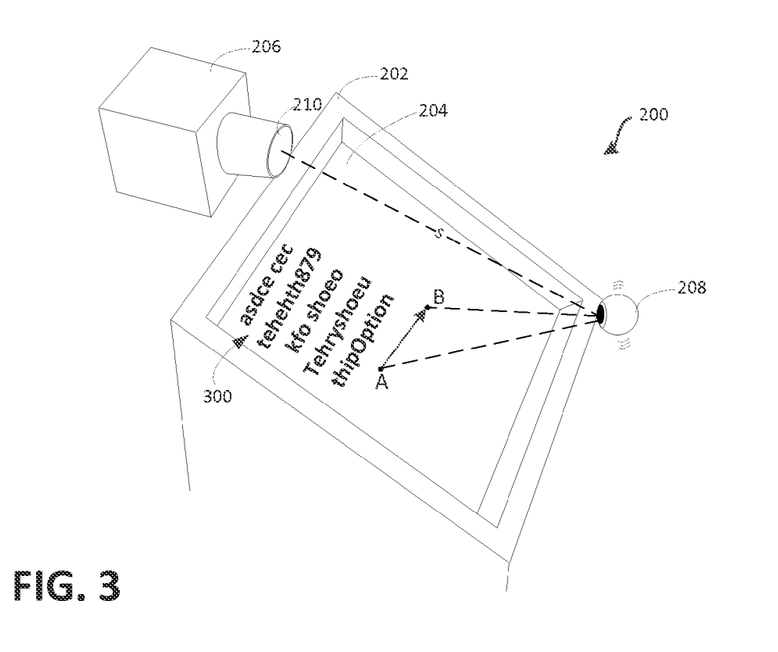
FIG. 3 shows another example obscured display configuration that can be provided by the system of FIG. 1 when the user's eye is in motion.

Turning now to FIG. 3, another example of an obscured display configuration 300 is shown provided on the display screen 204 of the computing device 202. As the eye-tracking sensor 206 detects that the user's eye 208 is in motion, e.g. moving across the display screen 204 from point A to point B, the obscured display configuration 300 is presented. In one embodiment, the obscured display configuration 300 is provided offset from a preceding or succeeding positioning of the actual and/or masking data to be presented. In another embodiment, the obscured display configuration 300 is output offset from a gaze-point or general focusing area of the user's eye 208, as detected by the eye-tracking sensor 206. For instance, as shown in FIG. 3, the masking data of the obscured display configuration 300 is presented in a contained area of the display screen 204, such as a corner of the display screen 204, and out of the general focusing area of the user's eye 208 as defined by points A and B. Still, in another aspect, it is contemplated that all or a portion of the masking data and/or the obscured display configuration 300 may be dynamic and move around, or flash, on the display screen 204 when output therethrough. Further, it is contemplated that the obscured display configuration 300 may vary in format and/or masking data throughout the user's viewing period. Merely by way of example, each obscured display configuration 300 for sequential saccadic movements may provide a graphic image to form a series of graphic images, such as a cartoon. In another example, the masking data comprises masking text that preserves an overall form of an actual word to be disguised, e.g. length and spacing. The masking data may serve as an overlay display configuration that is layered on top of the actual data to provide guidance to the user's peripheral vision while disguising the actual data. For instance, the eye-tracking engine 108 may determine a form of the actual data, such as word length, spacing, font size, and/or font of the actual data. The eye-tracking engine 108 may generate the masking data based on the determined form of the actual data for overlaying the actual data. Then, words or graphics of the actual data may be overlayed with words or graphics of the masking data that are similar in form to that of the actual data. For instance, a five-letter word in the actual data may be covered-up with another five-letter word or random grouping of letters in the overlay masking data. All or a portion of the masking data may be removed to reveal the underlying actual data when the eye is detected to be stationary. For instance, the actual data may be displayed at a detected gaze-point by removing the overlaying masking data at the gaze-point, while maintaining the masking data surrounding the gaze-point. Such overlayed masking text may be considerably degraded while still being useful as a reading guide.

Figure 4:
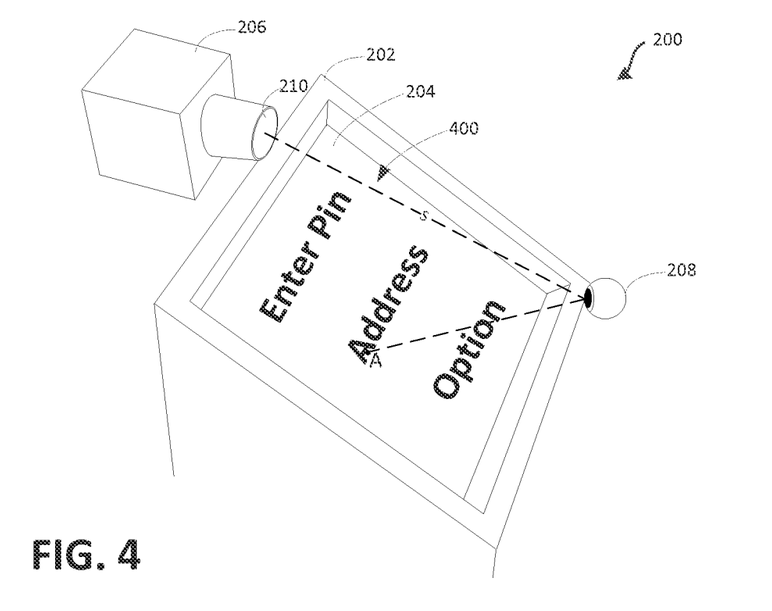
FIG. 4 shows an example unmasked display configuration that can be provided by the system of FIG. 1 when the user's eye is stationary.

Referring now to FIG. 4, an unmasked display configuration 400 comprising actual data, such as instructions and/or a user-received input, is output on the display screen 204 as the eye-tracking sensor 206 detects a fixation phase of the user's eye 208 where the user's eye 208 has momentarily stopped and information can be recognized. For instance, the user's eye 208 may be fixated at point A, whereby the user's eye 208 may be able to detect data surrounding the point A. Merely by way of example, the user's eye 208 may be able to detect several letters, e.g. 3-4 letters, to the left and/or right of point A. In FIG. 4, the unmasked display configuration 400 may comprise actual data and no masking data. In another embodiment, the unmasked display configuration 400 may contain actual data only at the gaze-point as identified by the eye-tracking sensor 206, such as point A, while a remainder of the display screen 204 remains blank, e.g. the remaining actual data is hidden. Merely by way of example, the fixation or gaze-point, point A, may be identified by the eye-tracking sensor 206 and its position used to determine the display configuration such that only "Address" appears on the display screen 204.

Figure 5:
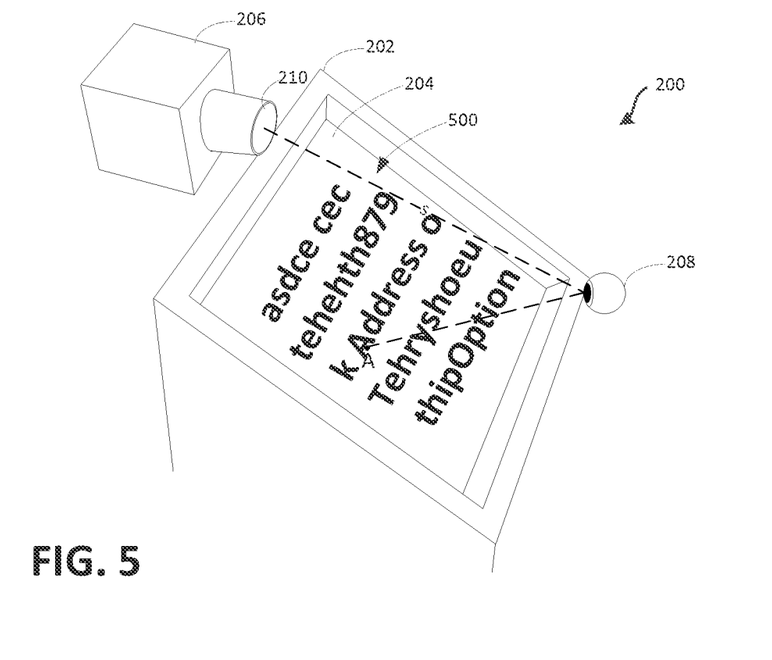
FIG. 5 shows another example unmasked display configuration that can be provided by the system of FIG. 1 when the user's eye is stationary.

In a different embodiment, as shown in FIG. 5, the actual data surrounding the gaze-point, point A, is obscured, overlayed, and/or replaced with masking data. More particularly, FIG. 5 illustrates an unmasked display configuration 500 having actual data at and/or near the gaze-point, point A, and masking data surrounding the gaze-point. In that case, the user's eye 208 may see a portion of the surrounding masking data in its peripheral vision field, although such portions may not be recognizable for reading.

It is further contemplated that the unmasked display configurations 400,500 may show an entire word when at least a portion of the word occurs at or neighbors point A. This permits the entire word to be fixated by the user's eye. However, it is noted that during a single fixation phase, an amount of information that can be recognized is limited and may vary between users and/or may vary for a single user based on the occurrence of common word groupings. For instance, the unmasked display configuration 400,500 may output large chunks of words together that are easily recognizable by the user. Such common groupings of actual data or strings of text may include, merely by way of example, "the name of," "written by," "breakfast food," and so on, and may vary from user-to-user. In this way, it is contemplated that the user may input certain groups of words that the user commonly recognizes. The user-selected groupings may be stored in the user-profile, such that the eye-tracking engine 108 outputs, or otherwise reveals, the groupings simultaneously in the unmasked display configurations 400,500. In another aspect, uncommonly recognized words can be broken down and provided in sections at separate time intervals. For instance, a long word such as "hypervitaminosis" may be output as actual data in sequential sections, (hyper)(vitamin)(osis), whereby the user's eye fixates on each section at a time rather than the entire word. A saccadic movement may be detected by the eye-tracking sensor 206 as the user's eye 208 moves from section to section. It is contemplated that the user may identify such uncommon words in the user-profile, and/or the eye-tracking engine 108 may contain an updatable list of such uncommon words to be broken up when presented. Even further, it is contemplated that the system 200 may provide a calibration step for identifying each user's reading characteristics.

Figure 6:
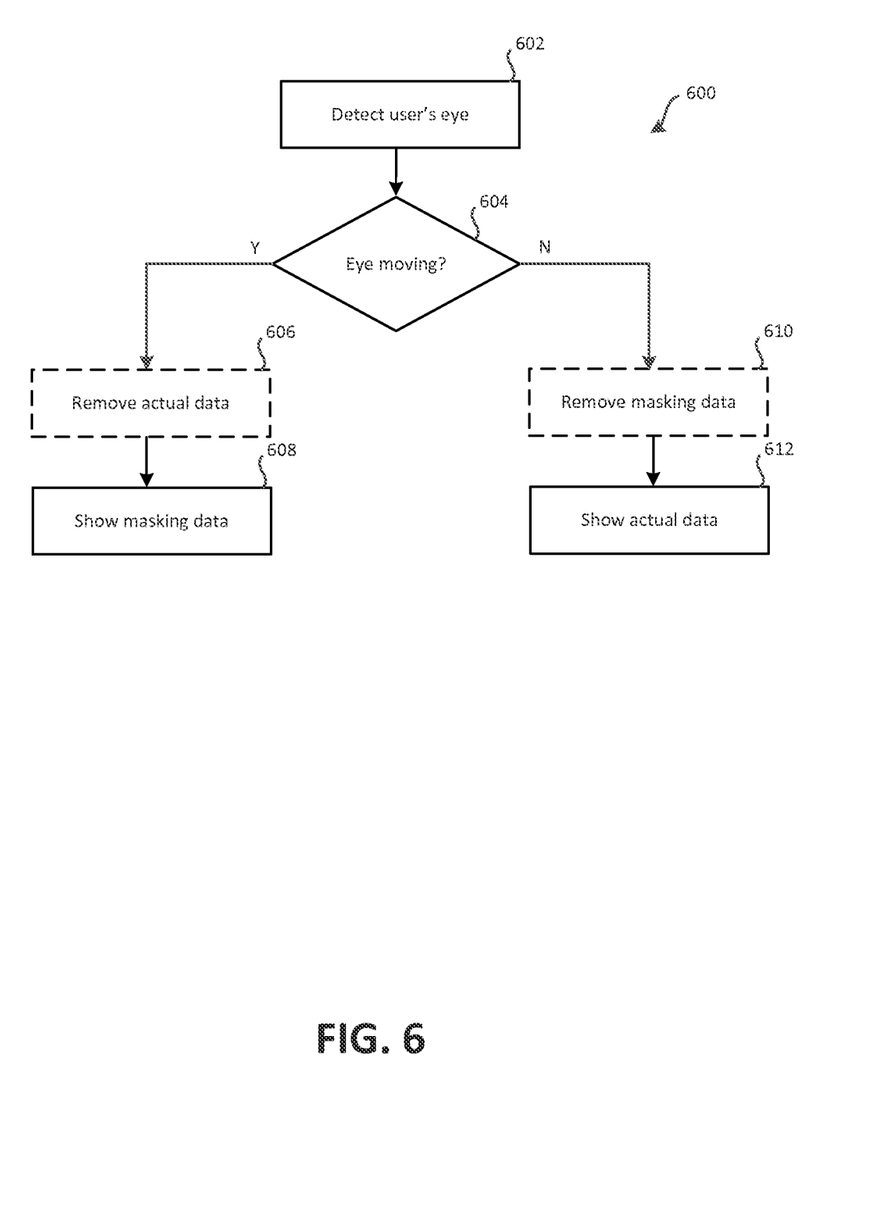
FIG. 6 shows a method that can be performed by various embodiments of the system of FIG. 1.

Turning now to FIG. 6, a method 600 provided for by the eye-tracking engine 108 of the computing device 102 is shown. More particularly, the computing device 102 may comprise a memory that includes processor-readable instructions stored therein that, when executed by a processor, cause the processor to carry out one or more of the steps described below. The method 600 may include the step of detecting the intended user's eye (step 602). Merely by way of example, step 602 may include detecting features of the user's eye and/or biometric input from the user, such as the user's facial features, fingerprint, and the like, and comparing the identifying features to reference features stored in a database. The database may be stored in the computing device 102 and/or accessed through a network. In another aspect, the user may be identified by a username and/or passcode input, whereupon the user-profile linked to the user is implemented in subsequent steps of method 600. Further, in another embodiment, step 602 identifies a presence of the user's eye, such as a presence of the user in front of the display screen 204. In a different embodiment, the eye-tracking engine 108 determines that a foreign or unauthorized user is identified and present for a threshold period of time. Merely by way of example, the threshold period of time may be about one minute to about three minutes. In that case, the eye-tracking engine 108 may lock the display screen 204 from further activity.

Still referring to FIG. 6, the method 600 may further include determining, by the eye-tracking engine 108, if the detected eye is moving (step 604), e.g. in a saccadic phase and/or not in a fixation phase. If the eye-tracking engine 108 determines based on the sensed data that eye is moving, the method 600 may remove actual data on the display screen 204 if actual data were previously presented (step 606). For instance, the unmasked display configurations 400,500 may be entirely removed and/or only the actual data contained in the unmasked display configurations 400,500 may be removed. It is noted that this step, and any other method step presented by this disclosure, may be optional. The method 600 may further comprise outputting the masking data to provide the obscured display configuration 212,300 (step 608). Thereafter, the method may return to step 602 or 604 to manage further display configurations. In one aspect, it is contemplated that the eye-tracking sensor 206 continuously detects for sensed data throughout the method 600. The sensed data may contain information related to motion or stillness of the user's eye, a gaze-point of the user's eye, and/or location of the user's eye which may be used for adjusting and/or pivoting the eye-tracking sensor 106,206. Further, the eye-tracking sensor 206 may detect for passersby or a foreign user's eyes and/or a length of time that the foreign user is present while the intended user is viewing the display screen 204. In that case, the eye-tracking engine 108 may initiate a locked screen or other alert, such as a pop-up warning notification, to the intended user that an intruder is present. In some embodiments, the notification may be sent to a mobile device of the user. This may be useful, for instance, if the user is briefly away from the computing device 202 and the eye-tracking sensor 206 detects that someone is trying to read or access the computing device 202.

As further shown in FIG. 6, the eye-tracking engine 108 may determine that the user's eye is stationary, e.g. in a fixation phase and/or not in a saccadic phase. In that case, the method 600 may comprise the step of removing the masking data from a preceding obscured display configuration 212,300 (step 610), if any, and/or displaying the actual data in the unmasked display configuration 400,500 (step 612). The method may return to step 602 or 604 after displaying 612 the actual data. It is noted that displaying the actual data at step 612 may be interrupted, for instance, if the eye-tracking sensor 206 detects a foreign user is present for a predetermined length of time.

Figure 7:
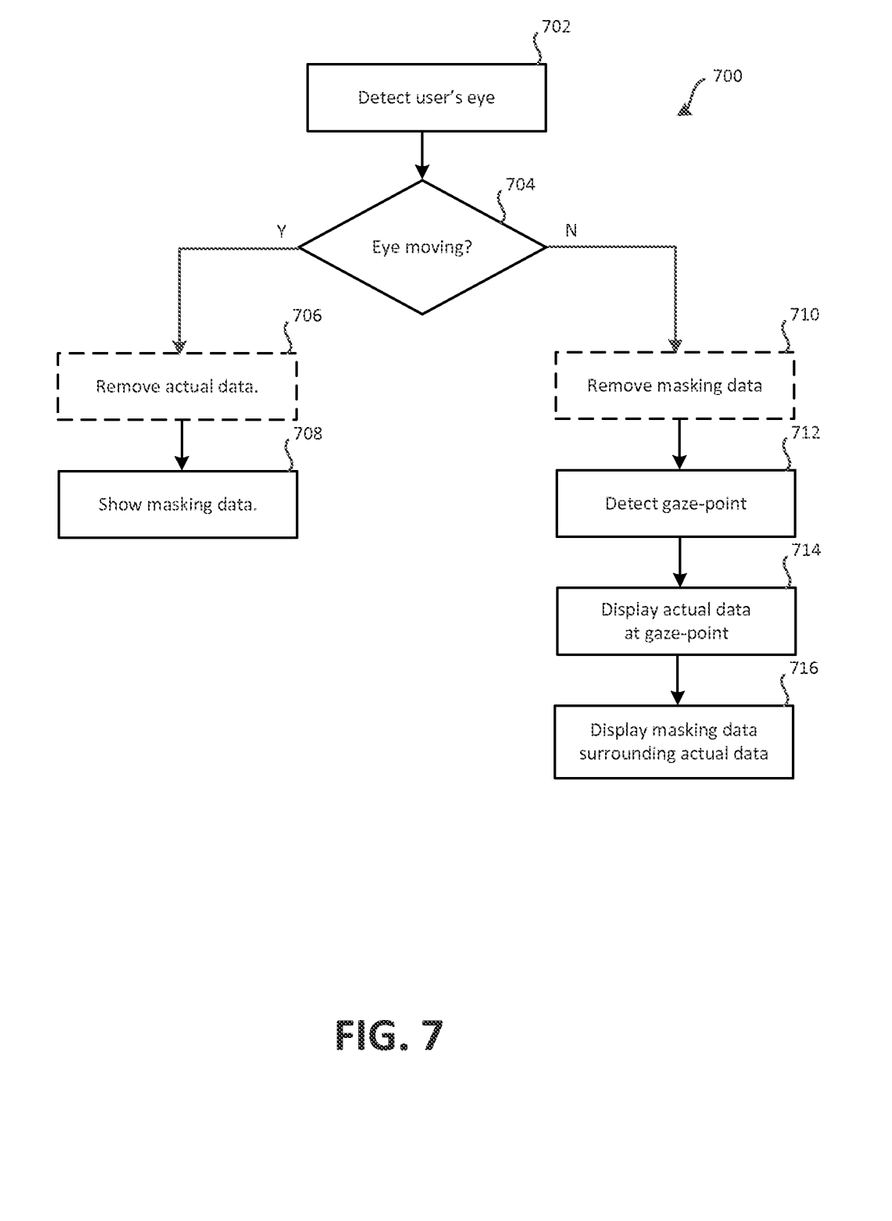
FIG. 7 shows another method that can be performed by various embodiments of the system of the system of FIG. 1.

Turning now to FIG. 7, a method 700 for outputting the actual data at a gaze-point identified by the eye-tracking engine 108 based on the sensed data is shown. The method 700 may include, additionally and/or alternatively, any of the steps presented in the method 600 above. The method 700 may include detecting the user's eye (step 702). For example, the method may determine if the user's eye is looking at the display screen 204 or looking elsewhere. If the user's eye is determined to be directed on the display screen 204, the method may continue to step 704 to determine if the user's eye is in motion or not. If the user's eye is in motion, then the method may continue to step 706 for removing any actual data that is on the display screen 204 and showing the masking data (step 708). In some aspects, the masking data comprises a blank screen, and/or different background colors, that are flashed and/or moving on the display screen 204. The method 700 may continuously return to step 702 and/or 704 after the masking data is provided.

In another embodiment, the method 700 of FIG. 7 detects at step 704 that the user's eye is not moving. In that case, the method 700 may continue to remove any masking data provided on the display screen 204 (step 710) and detect a gaze-point of the user's eye (step 712). Further, the method may include displaying actual data at and/or surrounding the gaze-point (step 714), and displaying and/or retaining any previously shown masking data surrounding the gaze-point (step 716). It is noted that the steps for method 700 may be implemented in any order. For instance, the gaze-point may be determined before, after, and/or simultaneously with determining if the eye is moving (step 704) and/or removing (step 710) the masking data. Following step 716, the method 700 may return to step 702 and/or 704.

Figure 8:
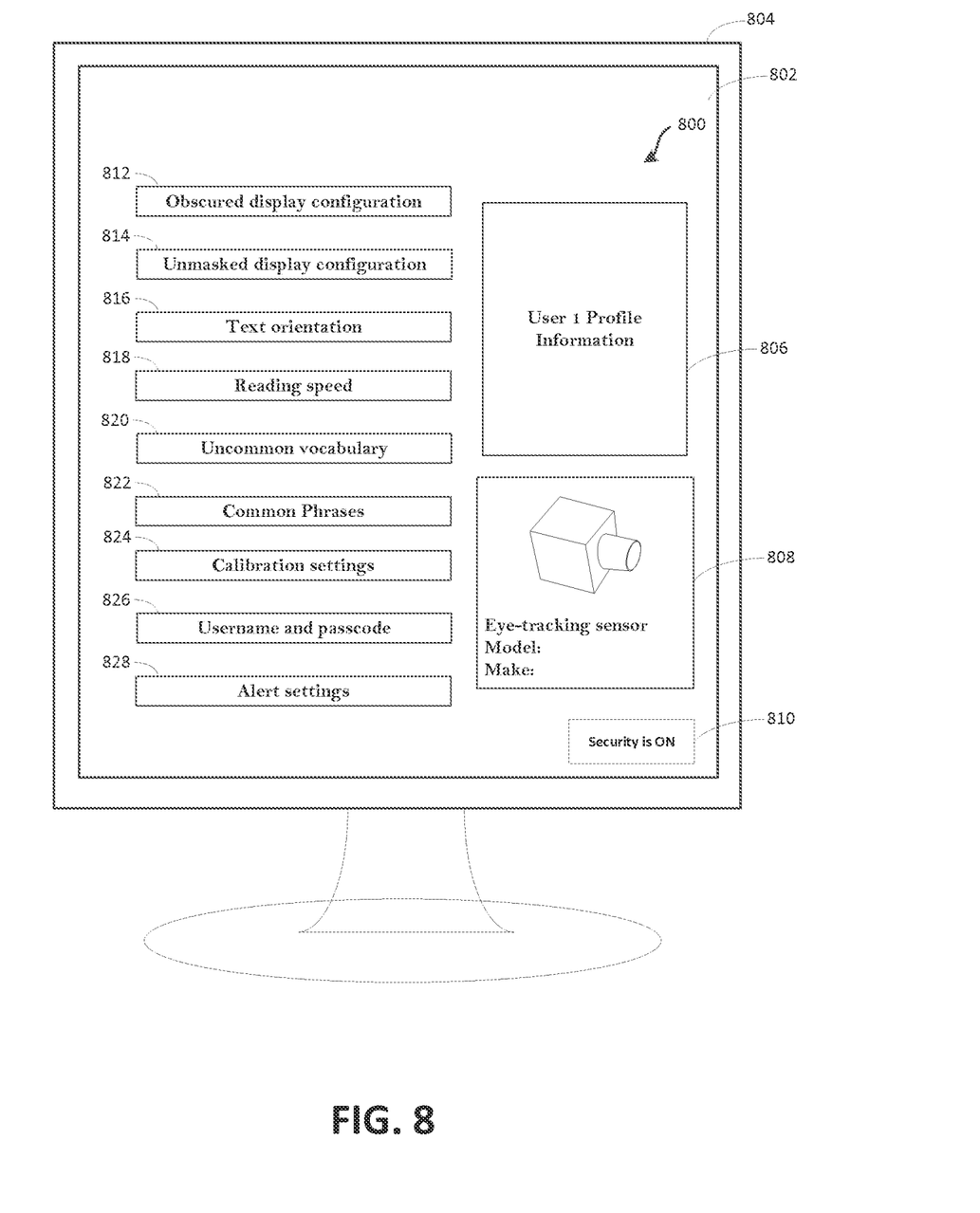
FIG. 8 shows an example user interface that can be provided by the system of FIG. 1.

Turning now to FIG. 8, an example user interface 800 that may be provided by the eye-tracking engine 108 is shown on a display screen 802 of a display device or a computing device 804. The user interface 800 may be a graphical and/or textual interface configured to receive input from the user, such as a menu that allows a user to select various user-profile settings. It is contemplated that the gaze-based security system described herein provides a plurality of user-profiles for a plurality of users, whereupon each profile may be called up by identification of the user through the eye-tracking sensor 206 and/or a username and passcode combination. Further, it is contemplated that the user interface 800 may provide any number of components or selection items, including items that are not shown in FIG. 8, and that any of the items may open to further menus and/or selection windows.

As shown in FIG. 8, the user interface 800 may include user-profile information 806, such as a user name, identification number, location as determined by location data received from a GPS system, and the like. The user-profile information 806 may further include an identifying picture, user-selected image, and/or an image of the user's eye or features thereof. Even further, it is contemplated that the user-profile information 806 may include a brief overview or summary of various settings implemented for the user. For instance, the user-profile information 806 may indicate if the gaze-based security systems and methods described herein are active, on standby, or off. Merely by way of example, the user-profile information 806 may indicate that the security system is on if the eye-tracking engine 108 determines, based on the user's location data, that the user is located in a busy, public area, such as a restaurant or café, and/or if the eye-tracking sensor 206 detects a threshold level of activity in the environment containing the computing device 804. For instance, the threshold level of activity may be based on the sensor detecting a high level of movement in a background of the user. The threshold level of activity and/or locations for activating the gaze-based security system may be input by the user, for instance, by selecting the user-profile information 806 through clicking, voice, and/or touch-screen interaction.

FIG. 8 further shows a sensor information 808 box that may contain an image of the eye-tracking sensor 206, related software data, model and/or make number. In one embodiment, it is contemplated that the user may select the sensor information 808 box and choose which sensors, if a plurality of sensors are available, are activated. The activated sensors may be displayed in the sensor information 808 box. Merely by way of example, the sensor information 808 box may display software updates that are readily available, and/or further sensor-related options for the user. Furthermore, a toggle switch 810 may be presented in a corner, such as a lower-right corner, of the display screen 802. The toggle switch 810 may be present at all times to allow the user to turn on or off the gaze-based security system described herein. Furthermore, the toggle switch 810 may provide different text, such as "Security is ON" or "Security is OFF" depending on the operation that is presently activated.

The user interface 800 shown in FIG. 8 further includes a plurality of menu items, such as items 812-828, that are available for the user to adjust various settings associated with the user-profile. It is contemplated that the user may also customize the user interface 800 by selecting particular menu items to appear in the user interface 800. For instance, an obscured display configuration option 812 may be provided to allow the user to customize various obscured display configurations. As mentioned previously, the user may use the obscured display configuration option 812 to select a type of masking data to be shown, such as nonsense letters, symbols, coherent text and/or sentences, stories, graphics, hieroglyphics, web-dings, emoticons, characters from other languages, news articles, user-customized text, and so on. Furthermore, option 812 may permit the user to select color schemes, orientation of the masking data, animations for the masking data, and the like. In another example, the obscured display configuration option 812 may include an overlay of masking text over existing text, whereby the masking text comprises word lengths, spacing, and characters similar to the form of the actual word being masked.

The user interface 800 may further include an unmasked display configuration option 814. The user may use this option 814 to select whether all actual data is shown in an unmasked display configuration or if a combination of actual data and masking data are to be shown. Further, the option 814 may permit the user to select a portion of the actual data to be shown, for instance, if all actual data beneath the user's gaze-point is to be shown such that any portion of the display screen 802 above the user's gaze-point is masked and/or blank. In that case, previously-read protected information is masked. In another aspect, it is contemplated that the user may select a font and/or size of the actual data to be shown, which may be the same or different than those of the masking data.

Still in reference to FIG. 8, in another aspect, it is contemplated that the user interface 800 provides further options for displaying the actual data. Such options may be included in a submenu of the unmasked display configuration option 814 and/or provided on the user interface 800 as shown. For instance, the user interface 800 may provide a text orientation option 816 to allow the user to select if the actual data is presented vertically, horizontally, and/or if the data is read vertically or horizontally. The text orientation option 816 may also permit the user to adjust where on the display screen 802 the actual and/or masking data appears. A reading speed 818 option may be provided for a user to associate a general reading speed, such as slow, medium, and fast, or a reading level, such as beginner, intermediate, and advanced, with the user-profile. This selection may be utilized by the eye-tracking engine 108 to better optimize the unmasked display configuration. In a different aspect, an uncommon vocabulary option 820 may allow the user to list and/or select from a list uncommonly recognized words that may be displayed for a longer period of time. In another aspect, such words identified in the list may be broken down and provided in sections at separate time intervals. In a further aspect, a common phrases option 822 may be provided for the user to input a list of word groupings, or large chunks of words, in the actual data that may be presented simultaneously. Such phrases may be commonly recognized by the user.

In a further aspect, the user interface 800 may provide a calibration settings option 824 to permit the gaze-based security to calibrate to the user's reading characteristics. For instance, the eye-tracking sensor 206 may track the user's eyes while reading various difficulty levels of text and/or graphics to determine the user's reading speed and/or reading level. The identified calibration characteristics may be associated with the user's profile such that when the eye-tracking sensor 206 detects the user, the unmasked display configuration and/or obscured display configuration will be optimized for the user. For instance, actual data may be presented in larger and/or smaller chunks according to the user's reading speed. Furthermore, the calibration settings option 824 may allow the user to store a scan of the user's eye, and/or other biometric input. The stored scan may be utilized as a reference data, such as a reference eye profile for comparing against the sensed data by the eye-tracking engine 108 to identify the user.

In another aspect, the user interface 800 identifies the user and/or implements a particular user profile based on a username and passcode option 826. Merely by way of example, the user may associate a username and/or passcode with the user-profile to gain access to actual data and/or settings associated with the user-profile. For instance, when the eye-tracking engine 108 determines a particular user is present, either by user/passcode identification and/or sensing from the eye-tracking sensor 206, a particular obscured display configuration 212 may be implemented.

In a further aspect, the user interface 800 provides an alert settings option 828 that allows the user to select whether the eye-tracking sensor 206 detects for passers-by or foreign user's eyes, and/or a length of time that a foreign or unauthorized user is present while the intended user is present. The alert settings option 828 may allow the user to indicate various operational modes if such detections occur. For instance, the user may select whether to automatically lock the screen and/or send an alert, such as a pop-up warning notification or text message, to the intended user if an intruder is present.

Figure 9:
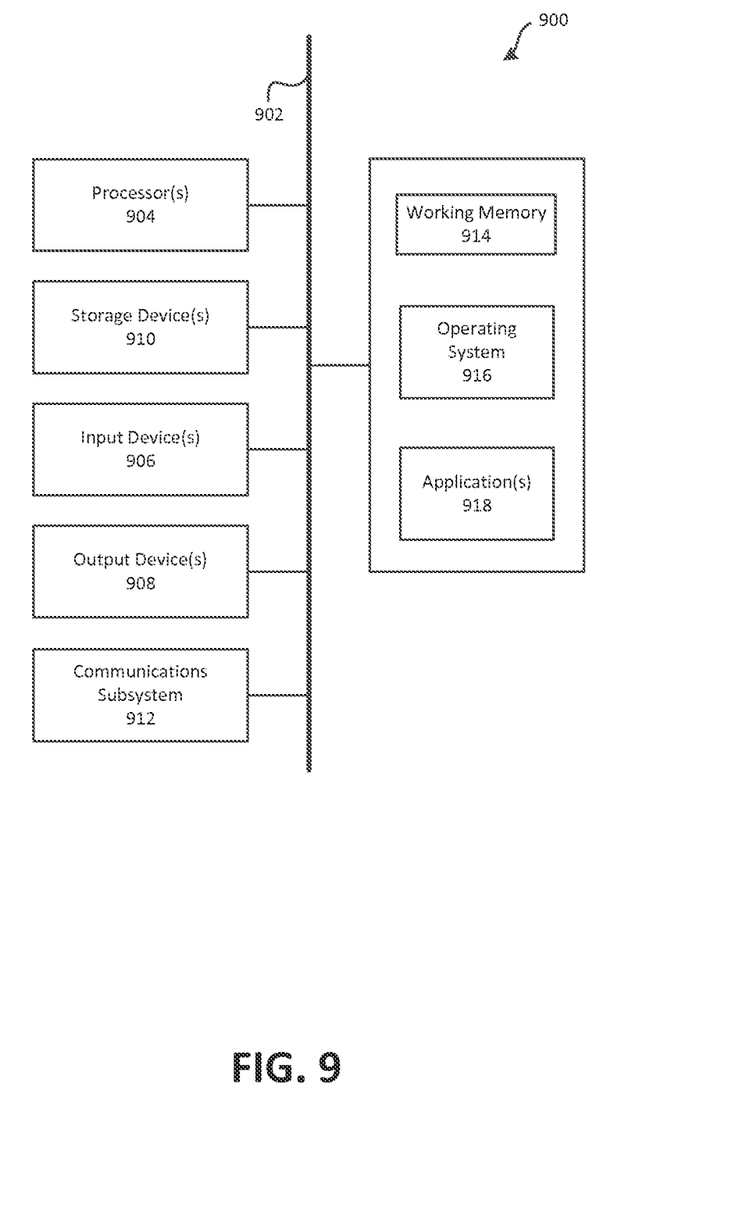
FIG. 9 shows a computing system that can be related to the system of FIG. 1.

FIG. 9 shows an example device or computer system 900 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 900, such as any of the respective elements of at least FIG. 1. In this manner, any of one or more of the respective elements of at least FIG. 1 may be configured to perform and/or include instructions that, when executed, perform the method of FIG. 6 and/or the method of FIG. 7. Still further, any of one or more of the respective elements of at least FIG. 1 may be configured to perform and/or include instructions that, when executed, instantiate and implement functionality of the computing device 102, the eye-tracking engine 108, and/or the server(s).

The computer system 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., computer monitor or television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer system 900 might also include a communications subsystem 912, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many embodiments, the computer system 900 will further comprise a working memory 914, which may include a random access memory and/or a read-only memory device, as described above.

The computer system 900 also may comprise software elements, shown as being currently located within the working memory 914, including an operating system 916, device drivers, executable libraries, and/or other code, such as one or more application programs 918, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the disclosure. According to a set of embodiments, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer system 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for presenting actual data on a display device based on eye-tracking data, comprising:
   one or more processors; and
   a memory communicatively coupled with and readable by the one or more processors and having stored therein processor-readable instructions that, when executed by the one or more processors, cause the one or more processors to:
   receive sensed data from an eye-tracking device;
   generate intended user data associated with an intended user profile, wherein the intended user profile is associated with an intended user of the eye-tracking device, and wherein the intended user data includes user preferences associated with masking data and actual data for display on the display device;
   determine a movement status of an eye of the intended user based on the sensed data;
   determine a display configuration for output on the display device based on the movement status;
   detect, by the eye-tracking device, a foreign user;
   determine, by the eye-tracking device, a time period for which the foreign user is present;
   determine that the time period for which the foreign user is present exceeds a predetermined threshold time period;
   in response to determining that the time period for which the foreign user exceeds the predetermined threshold time period, determine an activity profile of the environment of the eye-tracking device and the intended user, wherein the activity profile includes characteristics of the foreign user, level of activity in the environment, and level of risk associated with the activity;
   determine a type of masking data based on the activity profile and the intended user profile;
   adjust the display configuration for output on the display device, wherein the adjusted display configuration includes actual data and the determined type of masking data;
   output the adjusted display configuration through the display device; and
   transmit a notification to a mobile device of the intended user, wherein the notification indicates that the time period for which the foreign user is present exceeds a predetermined threshold time period and that the display configuration has been adjusted.

2. The system of claim 1, wherein the memory further includes processor-readable instructions stored therein that, when executed by the one or more processors, cause the one or more processors to determine a gaze-point based on the sensed data.

3. The system of claim 2, wherein the memory further includes processor-readable instructions stored therein that, when executed by the one or more processors, cause the one or more processors to output the actual data at the gaze-point where the sensed data indicates that the eye is stationary and output the masking data in a remainder of the display configuration.

4. The system of claim 1, wherein the memory further includes processor-readable instructions stored therein that, when executed by the one or more processors, cause the one or more processors to determine a word length and a spacing pattern of the actual data and generate the masking data based on the word length and the spacing pattern.

5. The system of claim 4, wherein the memory further includes processor-readable instructions stored therein that, when executed by the one or more processors, cause the one or more processors to display the masking data as an overlay on the actual data surrounding a gaze-point so that the actual data at the gaze-point is not masked.

6. The system of claim 1, wherein the memory further includes processor-readable instructions stored therein that, when executed by the one or more processors, cause the one or more processors to generate the masking data to comprise nonsense text.

7. The system of claim 1, wherein the memory further includes processor-readable instructions stored therein that, when executed by the one or more processors, cause the one or more processors to identify a user by comparing the sensed data to reference data comprising at least one reference eye profile.

8. The system of claim 1, wherein the display device comprises masking data when the movement status indicates the eye is in motion.

9. The system of claim 1, wherein the memory further includes processor-readable instructions stored therein that, when executed by the one or more processors, cause the one or more processors to sense data from the eye-tracking device over a period of time, and wherein the intended user profile is adjusted based on the data sensed over the period of time.

10. The system of claim 1, wherein the activity profile includes data associated with a level of movement in the environment.

11. The system of claim 1, wherein the memory further includes processor-readable instructions stored therein that, when executed by the one or more processors, cause the one or more processors to:
  adjust the activity profile of the environment based on new sensed data that includes a change to the environment; and
  adjust the set of masking data to a different type of masking data based on the adjusted activity profile.

12. The system of claim 1, wherein the display configuration is only adjusted if the determined activity profile of the environment exceeds a threshold level of activity in the environment, wherein the threshold level of activity is determined by the sensed data.

13. A method for presenting actual data on a display device based on eye-tracking data, comprising:
  receiving, at an eye-tracking engine, sensed data from an eye-tracking device;
  generating intended user data associated with an intended user profile, wherein the intended user profile is associated with an intended user of the eye-tracking device, and wherein the intended user data includes user preferences associated with masking data and actual data for display on the display device;
  determining, by the eye-tracking engine, a movement status of an eye of the intended user based on the sensed data;
  determining, by the eye-tracking engine, a display configuration for output on the display device based on the determined movement status;
  detecting, by the eye-tracking device, a foreign user;
  determining, by the eye-tracking device, a time period for which the foreign user is present;
  determining that the time period for which the foreign user is present exceeds a predetermined threshold time period;
  in response to determining that the time period exceeds a predetermined threshold time period, determining an activity profile of the environment of the eye-tracking device and the intended user, wherein the activity profile includes characteristics of the foreign user, level of activity in the environment, and level of risk associated with the activity;
  determining a type of masking data based on the activity profile and the user profile;
  adjusting the display configuration for output on the display device based on determining that the time period for which the foreign user is present exceeds the predetermined threshold time period, wherein the adjusted display configuration includes actual data and the determined type of masking data;
  outputting, by the eye-tracking engine, the adjusted display configuration through the display device; and
  transmitting a notification to a mobile device of the intended user, wherein the notification indicates that the time period for which the foreign user is present exceeds a predetermined threshold time period and that the display configuration has been adjusted.

14. The method of claim 13, further comprising removing, by the eye-tracking engine, the actual data from the display configuration when the movement status indicates the eye is in motion.

15. The method of claim 13, further comprising determining, by the eye-tracking engine, a gaze-point of the eye and displaying, by the eye-tracking engine, the actual data at the determined gaze-point when the movement status indicates the eye is stationary.

16. An eye-tracking device for determining a status of a user's eye and presenting actual data based on the determined status, comprising:
  a camera for sensing data based on the user's eye;
  one or more processors; and
  a memory communicatively coupled with and readable by the one or more processors and having stored therein processor-readable instructions that, when executed by the one or more processors, cause the one or more processors to:
  determine an overlay display configuration comprising masking data, wherein the masking data is based on at least one of a word length and a spacing pattern of the actual data;
  generate intended user data associated with an intended user profile, wherein the intended user profile is associated with the user, and wherein the intended user data includes user preferences associated with the masking data and unmasked data;
  determine that the user's eye is directed to a display screen coupled to the eye-tracking device;
  based on the sensed data, determine that the user's eye is in motion;
  after determining that the user's eye is in motion, display the overlay display configuration and the actual data on the display screen, wherein the overlay display configuration overlaps the actual data displayed on the display screen;
  detect a foreign user;
  determine a time period for which the foreign user is present;
  determine that the time period for which the foreign user is present exceeds a predetermined threshold time period;
  in response to determining that the time period exceeds a predetermined threshold time period, determine an activity profile of the environment of the eye-tracking device and the intended user, wherein the activity profile includes characteristics of the foreign user, level of activity in the environment, and level of risk associated with the activity;
  determine a new type of masking data based on the activity profile and the user profile;
  adjust the overlay display configuration based on determining that the time period for which the foreign user is present exceeds the predetermined threshold time period, wherein the adjusted display configuration includes actual data and the determined new type of masking data;
  based on the sensed data, determine that the user's eye is stationary;

determine a gaze-point of the user's eye; and after determining the gaze-point of the user's eye, remove at least a portion of the overlay display configuration to display the actual data at the determined gaze-point on the display screen.

17. The eye-tracking device of claim 16, wherein the memory further includes processor-readable instructions stored therein that, when executed by the one or more processors, cause the one or more processors to determine the intended user profile based on at least one of a username and a passcode received by the eye-tracking device.

18. The eye-tracking device of claim 16, wherein the memory further includes processor-readable instructions stored therein that, when executed by the one or more processors, cause the one or more processors to compare the sensed data comprising detected features of the user's eye to reference features stored in a database and identify the user's eye based on the comparison.

19. The eye-tracking device of claim 18, wherein the memory further includes processor-readable instructions stored therein that, when executed by the one or more processors, cause the one or more processors to determine a user profile based on the identified user's eye and determine the overlay display configuration based on settings associated with the determined user profile.

20. The eye-tracking device of claim 16, wherein the memory further includes processor-readable instructions stored therein that, when executed by the one or more processors, cause the one or more processors to display, after reaching the threshold period of time, a notification on the display screen indicating that an intruder is present.

21. The eye-tracking device of claim 20, wherein the memory further includes processor-readable instructions stored therein that, when executed by the one or more processors, cause the one or more processors to remove the actual data from the display screen after reaching the threshold period of time and lock the display screen after reaching the threshold period of time.

\* \* \* \* \*